United States Patent
Deng et al.

(10) Patent No.: US 11,615,217 B2
(45) Date of Patent: Mar. 28, 2023

(54) CONFIGURATION UPDATE METHOD FOR LED DISPLAY SCREEN, RECEIVER CARD, LED DISPLAY MODULE, AND LED DISPLAY SCREEN

(71) Applicants: SHENZHEN ABSEN OPTOELECTRONIC CO., LTD., Guangdong (CN); HUIZHOU ABSEN OPTOELECTRONIC CO., LTD., Guangdong (CN)

(72) Inventors: Hanqing Deng, Guangdong (CN); Yiji Chen, Guangdong (CN); Changjin Shi, Guangdong (CN)

(73) Assignees: SHENZHEN ABSEN OPTOELECTRONIC CO., LTD., Guangdong (CN); HUIZHOU ABSEN OPTOELECTRONICS CO., LTD., Guangdong (CN)

( * ) Notice: Subject to any disclaimer, the term of this patent is extended or adjusted under 35 U.S.C. 154(b) by 174 days.

(21) Appl. No.: 17/290,552

(22) PCT Filed: Mar. 3, 2021

(86) PCT No.: PCT/CN2021/078906
§ 371 (c)(1),
(2) Date: Apr. 30, 2021

(87) PCT Pub. No.: WO2021/175257
PCT Pub. Date: Sep. 10, 2021

(65) Prior Publication Data
US 2022/0309196 A1    Sep. 29, 2022

(30) Foreign Application Priority Data
Mar. 4, 2020    (CN) .......................... 202010141501.7

(51) Int. Cl.
*G06F 21/84*    (2013.01)
*G06F 21/31*    (2013.01)
(Continued)

(52) U.S. Cl.
CPC .............. *G06F 21/84* (2013.01); *G06F 21/31* (2013.01); *G09G 3/32* (2013.01); *G09G 5/006* (2013.01)

(58) Field of Classification Search
CPC .......... G06F 21/44; G06F 21/31; G06F 21/84; G09G 3/32; G09G 5/006
See application file for complete search history.

(56) References Cited

U.S. PATENT DOCUMENTS 7,007,304 B1 *   2/2006   Girard ..................... G06F 21/84
                                                        726/30
7,053,864 B1 *   5/2006   Lee ........................ G09G 5/006
                                                        345/3.4

(Continued)

FOREIGN PATENT DOCUMENTS

CN           101025882 A       8/2007
CN           201383314 Y       1/2010
(Continued)

*Primary Examiner* — Vinh T Lam
(74) *Attorney, Agent, or Firm* — Brooks Kushman P.C.

(57) ABSTRACT

This application discloses a configuration update method for an LED display screen, a receiver card, an LED display module, and an LED display screen. The method includes: (S201) when it is detected that a receiver card is powered on, reading storage identity authentication data of the receiver card, and verifying whether the receiver card has been replaced; (S202) when it is determined that the receiver card has been replaced, outputting a configuration parameter stored in a memory to the receiver card, to update a configuration parameter of the receiver card; (S203) when it is detected that an LED display module is powered on, reading display identity authentication data of the LED (Continued)

display module, and verifying whether the LED display module has been replaced; and (S204) when it is determined that the LED display module has been replaced, outputting correction data of the LED display module to the receiver card.

15 Claims, 9 Drawing Sheets

(51) Int. Cl.
  *G09G 3/32* (2016.01)
  *G09G 5/00* (2006.01)

(56) References Cited

U.S. PATENT DOCUMENTS

| | | |
|---|---|---|
| 2010/0053177 A1 | 3/2010 | Diard et al. |
| 2010/0156878 A1 | 6/2010 | Chen |
| 2017/0132216 A1 | 5/2017 | Grabka et al. |
| 2019/0102130 A1* | 4/2019 | Lee ........................ G09G 5/006 |
| 2021/0210046 A1* | 7/2021 | Iverson ................. G09G 5/006 |

FOREIGN PATENT DOCUMENTS

| | | | | |
|---|---|---|---|---|
| CN | 102196229 A | | 9/2011 | |
| CN | 202711659 U | | 1/2013 | |
| CN | 103400550 A | | 11/2013 | |
| CN | 103680411 A | | 3/2014 | |
| CN | 104616622 A | | 5/2015 | |
| CN | 105913797 A | | 8/2016 | |
| CN | 109215565 A | * | 1/2019 | ............... G09G 3/32 |
| CN | 107452324 B | * | 7/2019 | ............... G09G 3/32 |
| CN | 110120199 A | * | 8/2019 | ............... G09G 3/32 |
| CN | 110599949 A | * | 12/2019 | ............... G09G 3/32 |
| CN | 110599949 A | | 12/2019 | |
| CN | 110704078 A | | 1/2020 | |
| CN | 110827749 A | * | 2/2020 | |
| CN | 110827749 A | | 2/2020 | |
| CN | 111312157 A | | 6/2020 | |
| CN | 109215565 B | * | 7/2020 | ............... G09G 3/32 |
| CN | 110853526 B | * | 9/2020 | ............. F16M 13/02 |
| JP | H08241261 A | | 9/1996 | |
| JP | 2015154233 A | | 8/2015 | |
| KR | 20060063462 A | | 6/2006 | |
| KR | 20140023105 A | | 2/2014 | |
| KR | 20200011829 A | | 2/2020 | |
| TW | 201025270 A | | 7/2010 | |
| TW | 201346606 A | | 11/2013 | |
| TW | 201915708 A | | 4/2019 | |

* cited by examiner

CONFIGURATION UPDATE METHOD FOR LED DISPLAY SCREEN, RECEIVER CARD, LED DISPLAY MODULE, AND LED DISPLAY SCREEN

CROSS-REFERENCE TO RELATED APPLICATION

This application is a national phase application of International Patent Application No. PCT/CN2021/078906 filed on Mar. 3, 2021, and claims priority to Chinese Patent Application No. 202010141501.7 which is filed with the China National Intellectual Property Administration on Mar. 4, 2020 and entitled "LED DISPLAY SCREEN AND CONFIGURATION UPDATE METHOD THEREOF, RECEIVER CARD, AND DISPLAY MODULE", the contents of which are incorporated herein by reference in its entirety.

TECHNICAL FIELD

This application relates to the field of display screen control technologies, and in particular, to a configuration update method for an LED display screen, a receiver card, an LED display module, and an LED display screen.

BACKGROUND

The descriptions herein only provide background information related to this application, but do not necessarily constitute the prior art. With rapid development of modern industrial technologies, LED (Light Emitting Diode, light-emitting diode) display screens have gradually been widely used in people's lives and industrial production processes. The LED display screens not only have simple manufacturing and can operate properly in different environments, but also are characterized by a high resolution, a wide visual range, a long visual distance, a large area, a large influence, and the like. The LED display screens are usually used in outdoor advertising, commercial display, stage rental, data visualization, and other fields. In the industry of full-color LED display screens, a display screen project is a semi-engineering project. A display screen cabinet is manufactured, tested, packaged, and shipped in a factory, and then goes through a series of processes such as installation, commissioning, and acceptance on a project site. In a rental project, rental companies around the world purchase display screen cabinets, and locally install screens into required screen sizes according to requirements, so that screen sizes are flexible and changeable.

An LED display screen implements video display through optical characteristics. Therefore, during pre-delivery design or use of the LED display screen, various circuit components in the display screen need to be commissioned and configured. A plurality of circuit components can be combined to implement a more complete and clear video display function only after commissioning or configuration. However, after some circuit components in the display screen are updated or repaired, matching resetting needs to be performed on the circuit components. For example, on an application site of a display screen, a circuit component in the display screen fails, and the display screen is suddenly off. At this critical moment, a technician needs to be sent for emergency processing. A hardware processing method is that a maintenance person needs to manually find a failure location, then remove screws from the display screen, and then replace the newly failed display component. Then a software-side processing method is to perform a matched update on information such as a version of the display component. After the update, the display component usually encounters problems such as version inconsistency, absence of an update program package, and a mismatch between software and a program package. An entire replacement process lasts for a comparatively long period, procedures are comparatively complex, and professionalism is high. In addition, a one-to-one correspondence is required in sequence, thereby causing uncertainty to project progress and wasting a lot of human and material resources.

A conventional technology relies on manual parameter setting for a display component in a display screen. As a result, a parameter setting process is comparatively long, and a parameter configuration process is cumbersome, thereby decreasing efficiency of parameter setting of the display screen.

TECHNICAL PROBLEM

An objective of the embodiments of this application is to provide a configuration update method for an LED display screen, a receiver card, an LED display module, and an LED display screen, so as to resolve an issue in a conventional technical solution that a parameter configuration process for a display component in an LED display screen is comparatively cumbersome, a parameter configuration period is comparatively long, and a parameter configuration process is complex, thereby wasting a lot of human and material resources.

TECHNICAL SOLUTIONS

To resolve the foregoing technical issue, the following technical solutions are used in the embodiments of this application.

According to a first aspect, a configuration update method for an LED display screen is provided. The LED display screen includes a receiver card, a signal adapter, and a plurality of LED display modules. The receiver card is connected to the signal adapter. The signal adapter is connected to the plurality of LED display modules. The receiver card is configured to output a video control signal to be transmitted to each LED display module through the signal adapter. A memory is disposed on the signal adapter. The method includes:

when it is detected that the receiver card is powered on, reading storage identity authentication data of the receiver card, and verifying whether the receiver card has been replaced;

when it is determined that the receiver card has been replaced, outputting a configuration parameter stored in the memory to the receiver card, to update a configuration parameter of the receiver card;

when it is detected that the LED display module is powered on, reading display identity authentication data of the LED display module, and verifying whether the LED display module has been replaced; and when it is determined that the LED display module has been replaced, outputting correction data of the LED display module to the receiver card.

In an embodiment, the receiver card is further used for video signal transmission, video signal processing, screen loading configuration, correction data storage, and working status indication, and the video control signal includes video data and video driver data.

In an embodiment, the memory is configured to store first identity authentication data of the receiver card, the configuration parameter of the receiver card, and second identity authentication data of each LED display module.

In an embodiment, the first identity authentication data includes identity information of the receiver card, the second identity authentication data includes identity information of the LED display module, and the configuration parameter includes parameter matching information of the receiver card and the LED display module.

In an embodiment, the reading storage identity authentication data of the receiver card, and verifying whether the receiver card has been replaced specifically includes:

reading the storage identity authentication data of the receiver card;

receiving the first identity authentication data stored in the memory; and comparing the storage identity authentication data with the first identity authentication data, and if the two are different, determining that the receiver card has been replaced.

In an embodiment, after the when it is determined that the receiver card has been replaced, outputting a configuration parameter stored in the memory to the receiver card, to update a configuration parameter of the receiver card, the method further includes:

replacing the first identity authentication data stored in the memory with the storage identity authentication data obtained through reading.

In an embodiment, before the receiving the first identity authentication data stored in the memory, the method further includes:

detecting whether the first identity authentication data is stored in the memory; and if it is detected that the first identity authentication data is not stored in the memory, outputting the storage identity authentication data obtained through reading and the configuration parameter of the receiver card to the memory, so that the memory stores the storage identity authentication data and the configuration parameter of the receiver card; or if it is detected that the first identity authentication data is stored in the memory, receiving the first identity authentication data stored in the memory.

In an embodiment, the reading display identity authentication data of the LED display module, and verifying whether the LED display module has been replaced specifically includes:

reading the display identity authentication data of the LED display module;

receiving the second identity authentication data stored in the memory; and comparing the display identity authentication data with the second identity authentication data, and if the two are different, determining that the LED display module has been replaced.

In an embodiment, after the outputting correction data of the LED display module to the receiver card, the method further includes:

replacing the second identity authentication data stored in the memory with the display identity authentication data obtained through reading.

In an embodiment, before the receiving the second identity authentication data stored in the memory, the method further includes:

detecting whether the second identity authentication data is stored in the memory; and if it is detected that the second identity authentication data is not stored in the memory, outputting the display identity authentication data obtained through reading to the memory, so that the memory stores the display identity authentication data; or if it is detected that the second identity authentication data is stored in the memory, receiving the second identity authentication data stored in the memory.

According to a second aspect, a receiver card is provided. The receiver card is applied to an LED display screen. The LED display screen includes a signal adapter and a plurality of LED display modules. The receiver card is connected to the signal adapter. The signal adapter is connected to the plurality of LED display modules. The receiver card is configured to output a video control signal to be transmitted to the LED display module through the signal adapter. The signal adapter includes a signal memory. The receiver card includes:

a receiving memory, a processor, and a computer program stored in the receiving memory and capable of running on the processor, where the processor calls the computer program to perform the following steps:

when power-on is detected, reading storage identity authentication data of the receiver card, and verifying whether the receiver card has been replaced; and when it is determined that the receiver card has been replaced, outputting a configuration parameter stored in the signal memory to the receiver card, to update a configuration parameter of the receiver card.

According to a third aspect, an LED display module is provided. The LED display module is applied to an LED display screen. The LED display screen includes a receiver card and a signal adapter. The signal adapter is connected to the receiver card. The signal adapter is connected to the LED display module. The receiver card is configured to output a video control signal to be transmitted to the LED display module through the signal adapter. A signal memory is disposed on the signal adapter. The LED display module includes a receiving memory, a processor, and a computer program stored in the receiving memory and capable of running on the processor, where the processor calls the computer program to perform the following steps:

when power-on is detected, reading display identity authentication data of the LED display module, and verifying whether the LED display module has been replaced; and when it is determined that the LED display module has been replaced, outputting correction data of the LED display module to the receiver card.

According to a fourth aspect, an LED display screen is provided, including a signal adapter, the receiver card provided above, and the plurality of LED display modules provided above. The receiver card is connected to the signal adapter. The signal adapter is connected to the plurality of LED display modules. The receiver card is configured to output a video control signal to be transmitted to each LED display module through the signal adapter. A memory is disposed on the signal adapter.

In an embodiment, the receiver card is connected to the memory to directly access the memory.

In an embodiment, the signal adapter further includes a processor. The processor is connected to the receiver card, each LED display module, and the memory. The processor is used for the receiver card and each LED display module to access data in the memory.

BENEFICIAL EFFECTS

Beneficial effects of the configuration update method for the LED display screen in the embodiments of this application lie in: In the configuration update method for the LED display screen, the memory is additionally disposed on the signal adapter, and the memory stores the identity information of the receiver card and the identity information of the LED display module. When whether the receiver card and/or the LED display module have/has been replaced is determined based on the identity information stored in the memory, efficiency of detecting an update status of the receiver card and the LED display module is improved, and a detection process is simplified. If it is detected that the receiver card and/or the LED display module have/has been replaced, data is automatically corrected for the receiver card and/or the LED display module, so that efficient parameter configuration is performed between the receiver card and the LED display module, and efficiency of video transmission in the LED display screen is guaranteed. Therefore, according to the configuration update method in the embodiments, after the receiver card and/or the LED display module are/is updated, the LED display screen can resume a normal working status in a short time through adaptive parameter configuration, without manual operations by additional professional technicians. A configuration update process of the receiver card and/or the LED display module is comparatively simple, thereby saving a lot of time in joint commissioning and joint testing on video control of the LED display screen.

BRIEF DESCRIPTION OF DRAWINGS

To describe the technical solutions in the embodiments of this application more clearly, the following briefly describes the accompanying drawings required for describing the embodiments or demonstrative technologies. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It should be understood that, the specific embodiments described herein are merely used to explain the present invention, but not to limit this application.

To describe the technical solutions provided in this application, the following provides detailed description with reference to specific accompanying drawings and embodiments.

Figure 1:
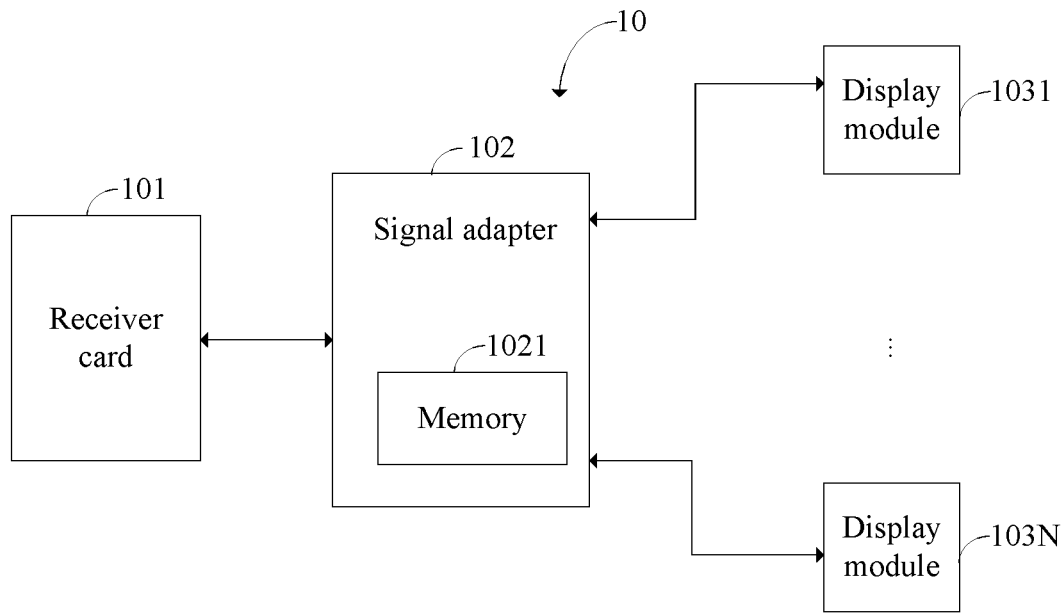
FIG. 1 is a schematic structural diagram of a display screen according to an embodiment of this application.

FIG. 1 is a schematic structural diagram of an LED display screen 10 according to an embodiment. The LED display screen 10 includes a receiver card 101, a signal adapter 102, and a plurality of LED display modules (1031, . . . , and 103N are used in FIG. 1, where N is an integer greater than 1). The receiver card 101 is connected to the signal adapter 102. The signal adapter 102 is connected to the plurality of LED display modules. Information can be exchanged between the receiver card 101 and the LED display modules through the signal adapter 102.

The receiver card 101 is configured to output a video control signal. As a data integration control center of the LED display screen 10, the receiver card 101 may serve as a control system of the LED display screen 10, and includes functions such as video signal transmission, video signal processing, screen loading configuration, correction data storage, and working status indication. In this embodiment, the video control signal includes video data, video driver data, and the like, so that the LED display screen 10 can access the video control signal to display complete image information, thereby improving video display quality and integrity of the LED display screen 10. For example, the video control signal is generated by an external controller.

The signal adapter 102 is configured to transmit the video control signal to each LED display module, so that each LED display module performs video display based on the video control signal. The LED display module has a video display function. The signal adapter 102 can establish a signal transmission path between the receiver card 101 and each LED display module. When parameters of the receiver card 101 and an LED display module match, the corresponding LED display module can receive and recognize the video control signal to complete video play. On the contrary, if parameters of the receiver card 101 and an LED display module do not match, the LED display module cannot recognize video data output by the receiver card 101. Therefore, an LED display module can receive complete video data only when version information, transmission information, and the like of the receiver card 101 and the LED display module are consistent.

A memory 1021 is disposed on the signal adapter 102. The memory 1021 is configured to store first identity authentication data of the receiver card 101, a configuration parameter of the receiver card 101, and second identity authentication data of each LED display module.

The memory 1021 has a data storage function. The memory 1021 can store the first identity authentication data, the configuration parameter, and the second identity authentication data. The first identity authentication data includes identity information of the receiver card 101. The second identity authentication data includes identity information of the LED display module. In this case, the first identity authentication data and the second identity authentication data are specific identifiers of circuit components. Therefore, the identity information of the receiver card 101 can be distinguished based on the first identity authentication data, and the identity information of the LED display module can be distinguished based on the second identity authentication data, thereby increasing real-time identity recognition efficiency for the receiver card 101 and each LED display module.

The configuration parameter includes parameter matching information of the receiver card 101 and the LED display module. Therefore, the memory 1021 can record a video matching status of the receiver card 101 and the LED display module, so that after the receiver card 101 is updated in the LED display screen 10, parameter setting is performed for the receiver card 101 based on the configuration parameter previously stored in the memory 1021, and parameter matching is quickly implemented between the receiver card 101 and the LED display module. Therefore, in this embodiment, the memory 1021 is additionally disposed on the signal adapter 102, and the signal adapter 102 serves an intermediate medium that distributes instructions of the receiver card 101 to LED display modules. The signal adapter 102 has a data storage function, thereby guaranteeing a configuration update rate of the receiver card 101 and/or the LED display module, and simplifying configuration update steps.

Optionally, the memory 1021 is an EEPROM (Electrically Erasable Programmable read only memory, electrically erasable programmable read only memory) or a flash memory. The flash memory is a non-volatile memory, and the flash memory has comparatively high data input and output efficiency. Therefore, in this embodiment, large-capacity data storage can be implemented by using the memory 1021, thereby retaining integrity and security of data storage, and guaranteeing identity information recognition accuracy for the receiver card 101 and/or the LED display module, so that the receiver card 101 has higher configuration update efficiency.

Figure 2:
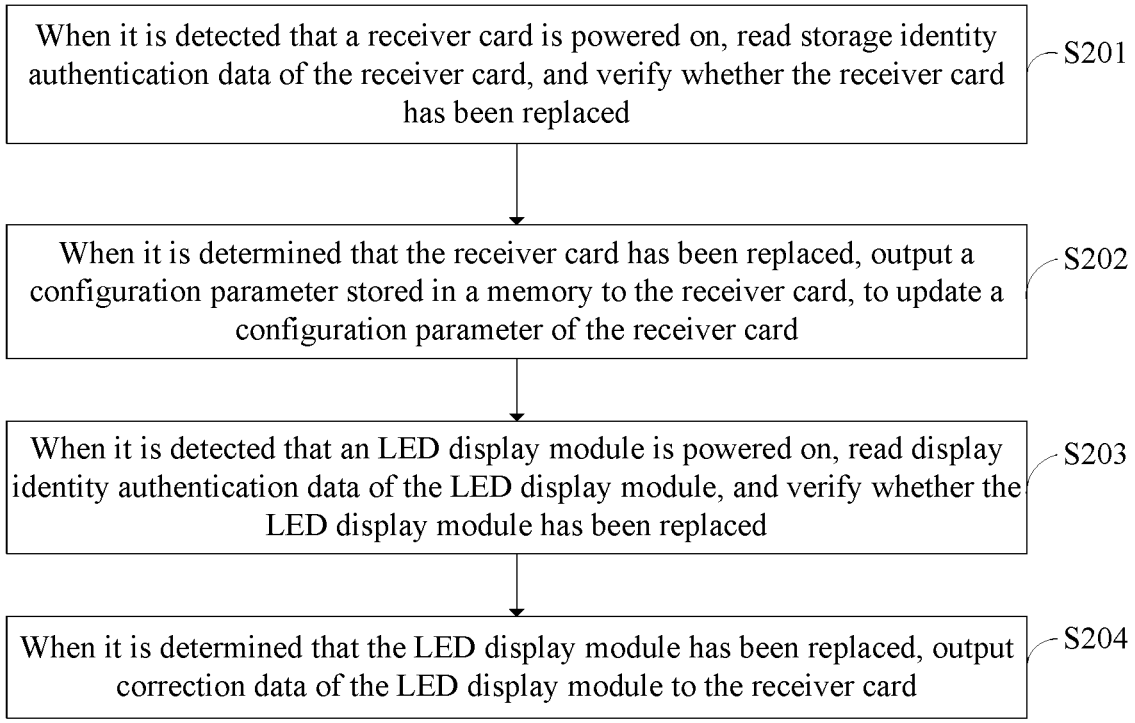
FIG. 2 is a specific flowchart of a configuration update method applied to a display screen according to an embodiment of this application.

During application of the LED display screen, the receiver card 101 and/or the LED display module of the LED display screen need/needs to be replaced. Therefore, each time the receiver card 101 and/or the LED display module are/is replaced, parameter matching setting needs to be performed for a replacing receiver card 101 and/or LED display module, so that data transmission can be quickly performed between the receiver card 101 and the LED display module, and the LED display screen 10 resumes a normal video display status. Therefore, in this embodiment of this application, with a configuration update method, whether the receiver card 101 and each LED display module have been replaced can be recognized, and data setting is performed for the replacing receiver card 101 and/or LED display module, thereby greatly reducing a joint parameter commissioning time for the receiver card 101 and each LED display module, and simplifying configuration update steps. Specifically, FIG. 2 shows a specific implementation process of the configuration update method provided in this embodiment of this application. Referring to FIG. 1, for ease of description, only a part related to this embodiment are shown, and details are as follows.

S201: When it is detected that the receiver card is powered on, read storage identity authentication data of the receiver card, and verify whether the receiver card has been replaced.

Specifically, if it is detected that the receiver card is powered on, and the receiver card can implement normal data transmission and circuit control, the first identity authentication data stored in the memory indicates identity information of a previous receiver card, and currently read storage identity authentication data of the receiver card indicates real-time identity information of the receiver card. In this case, whether the current receiver card and the previous receiver card are the same may be determined based on the first identity authentication data pre-stored in the memory, to verify an identity of the receiver card. In this case, a real-time replacement status of the receiver card is determined based on the first identity authentication data pre-stored in the memory, and determining accuracy and efficiency are comparatively high.

S202: When it is determined that the receiver card has been replaced, output a configuration parameter stored in the memory to the receiver card, to update a configuration parameter of the receiver card.

If it is determined that the receiver card has not been replaced, the current receiver card and the previous receiver card are the same. In this case, normal video data transmission is performed between the current receiver card and an LED display module. Video data output by the receiver card can be transmitted to each LED display module, to drive the LED display module to implement normal video display.

In S202, if it is determined that the receiver card has been replaced, parameter resetting needs to be performed for the receiver card, to implement parameter matching between a replacing receiver card and an LED display module. Specifically, the configuration parameter pre-stored in the memory is sent to the receiver card, and the configuration parameter pre-stored in the memory is replaced with a configuration parameter currently stored in the receiver card, to complete a process of updating the configuration parameter of the receiver card. Then an updated configuration parameter of the receiver card can be used to transmit video information with the LED display module still based on a previous communication mode, thereby completing the parameter setting for the replacing receiver card. In this way, quick configuration updates and commissioning are implemented between the receiver card and each LED display module, and the LED display screen displays more complete and clearer image information based on a video control signal.

Therefore, in this embodiment, previous data matching information of the receiver card is stored in the memory on the signal adapter, to implement real-time detection on a replacement status of the receiver card and adaptive parameter configuration, so that the LED display screen can quickly resume a normal working status.

S203: When it is detected that an LED display module is powered on, read display identity authentication data of the LED display module, and verify whether the LED display module has been replaced.

Specifically, when any LED display module in the LED display screen is powered on, it indicates that the LED display module can implement normal circuit functions, and then real-time verification on a replacement status of the LED display module is started. Display identity authentication data includes identity information of a current LED display module. Whether the current LED display module and a previous LED display module are the same may be determined based on the second identity authentication data pre-stored in the memory, and then whether parameter reconfiguration needs to be performed for the LED display module is determined, to ensure security and stability of video display of the LED display module. Therefore, in this embodiment, whether the LED display module has been replaced can be efficiently and quantitatively recognized based on the second identity authentication data pre-stored in the memory, and a replacement status of the LED display module can be automatically recognized and processed.

S204: When it is determined that the LED display module has been replaced, output correction data of the LED display module to the receiver card.

If it is determined that the LED display module has not been replaced, it indicates that the current LED display module and the previous LED display module are the same, and parameter reconfiguration does not need to be performed for the LED display module. Matching data transmission may be maintained between the current LED display module and the receiver card. The LED display module may receive the video control signal output by the receiver card, and implement complete and secure image display.

If it is determined that the LED display module has been replaced, adaptive parameter matching resetting needs to be performed for the LED display module, and the LED display module outputs its own correction data to the receiver card. The correction data is used to notify the receiver card that the LED display module has been replaced. In this case, the receiver card learns of an actual replacement status of the LED display module, and the receiver card quickly outputs the video control signal to a replacing LED display module, thereby implementing dynamic signal transmission between the receiver card and the replacing LED display module. Compatible communication can be maintained between the receiver card and the LED display module, thereby increasing a parameter commissioning rate and parameter commissioning accuracy of the LED display module. Each LED display module can quickly resume a normal video display status.

In the configuration update method shown in FIG. 2, the memory is additionally disposed on the signal adapter, and identity information of both a previous receiver card and a previous LED display module is stored in the memory. Therefore, although the receiver card and/or the LED display module are/is replaced, because data information stored in the memory has not changed, whether the receiver card and/or the LED display module have/has been replaced can be accurately determined based on the identity information stored in the memory, thereby improving detection accuracy and control efficiency for a replacement status of the receiver card and/or the LED display module. In addition, when it is determined that the receiver card and/or the LED display module are/is replaced, parameter reconfiguration is immediately performed for the receiver card and/or the LED display module, so that a replacing receiver card and/or LED display module can quickly resume a matching communication status, and the LED display screen can resume a normal working status, thereby reducing configuration update costs for the receiver card and/or the LED display module, and simplifying parameter reconfiguration steps. Therefore, in this embodiment, data configuration for the receiver card and the LED display module and adaptive parameter matching control are implemented by disposing the memory on the signal adapter. When the receiver card and/or the LED display module are/is replaced, after configuration update operations are performed, the LED display screen can resume a working status in a short time, without manual parameter resetting. This greatly facilitates an update and parameter setting process of a circuit component in the LED display screen, thereby effectively resolving problems that a conventional technology needs to rely on manual operations to implement a parameter reconfiguration process for an updated circuit component, which is time-consuming and labor-intensive, and parameter matching and commissioning steps are complex and cannot be universally applicable.

Figure 3:
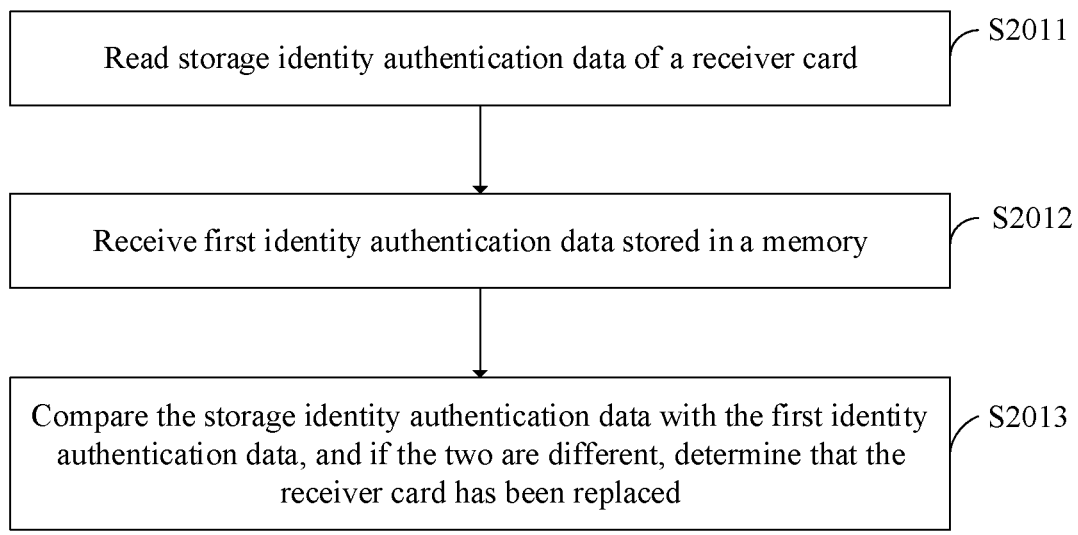
FIG. 3 is a specific flowchart of S201 of the configuration update method applied to a display screen in FIG. 2.

In an optional implementation, FIG. 3 shows a specific implementation process of S201 of the configuration update method in FIG. 2 in this embodiment. In S201, the reading storage identity authentication data of the receiver card, and verifying whether the receiver card has been replaced specifically includes the following steps.

S2011: Read the storage identity authentication data of the receiver card.

The storage identity authentication data includes identity information of a current receiver card. After the receiver card is successfully powered on, the receiver card can transmit a video control signal, and then the storage identity authentication data of the receiver card is collected in real time, to accurately recognize the identity information of the current receiver card, and start an identity information verification process for the receiver card.

S2012: Receive the first identity authentication data stored in the memory.

The first identity authentication data stored in the memory indicates identity information of a previous receiver card. Then the identity information pre-stored in the memory may be used as a reference for whether the current receiver card is updated. Then a replacement status of the current receiver card is automatically and accurately determined based on the identity information of the previous receiver card that is stored in the memory.

S2013: Compare the storage identity authentication data with the first identity authentication data, and if the two are different, determine that the receiver card has been replaced.

Specifically, if the storage identity authentication data obtained in S2011 is different from the first identity authentication data obtained in S2012, it indicates that the identity information of the current receiver card is different from that of the previous receiver card, and it indicates that the current receiver card has been replaced. If the storage identity authentication data obtained in S2011 is the same as the first identity authentication data obtained in S2012, it indicates that the identity information of the current receiver card is the same as that of the previous receiver card, and the current receiver card has not been replaced. In this case, parameter matching configuration operations do not need to be performed for the current receiver card, thereby completing a function of real-time and high-accuracy recognition of the replacement status of the receiver card. Therefore, in this embodiment, the currently collected identity information of the receiver card is compared with the identity information of the previous receiver card that is stored in the memory to automatically determine whether the receiver card has been replaced, thereby simplifying recognition steps and control steps for an update status of the receiver card, so that the LED display screen has higher video data transmission efficiency.

Figure 4:
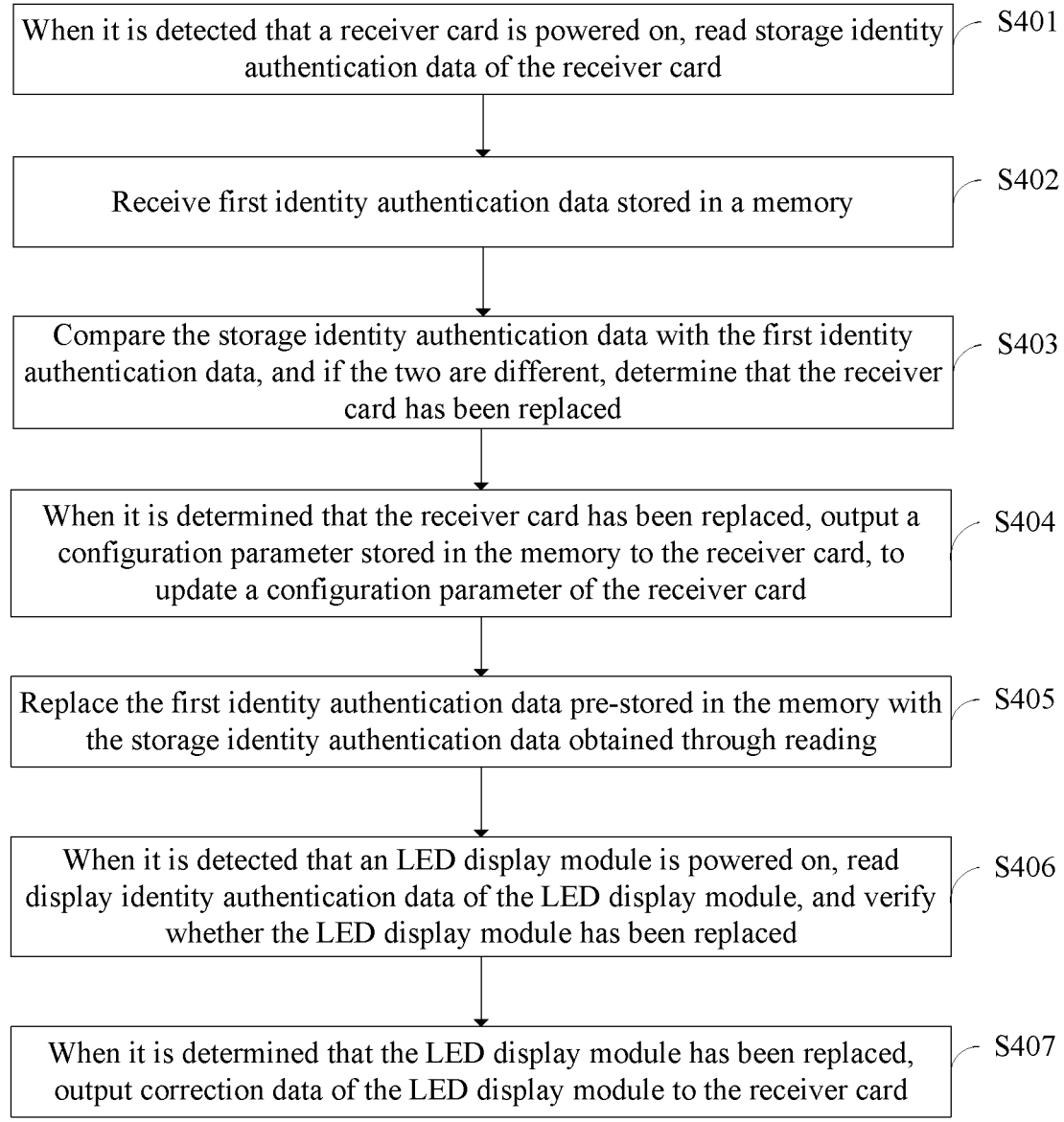
FIG. 4 is another specific flowchart of a configuration update method applied to a display screen according to an embodiment of this application.

In an optional implementation, FIG. 4 shows another implementation process of the configuration update method provided in this embodiment. Compared with the implementation processes of the configuration update method in FIG. 2 and FIG. 3, in FIG. 4, when it is determined that the receiver card has been replaced, the configuration parameter stored in the memory is output to the receiver card. After the configuration parameter of the receiver card is updated, the configuration update method further includes the following step.

S405: Replace the first identity authentication data stored in the memory with the storage identity authentication data obtained through reading.

When it is determined that the current receiver card has been replaced, parameter resetting operations are performed for a replacing receiver card, and the first identity authentication data previously stored in the memory is replaced with the storage identity authentication data of the current receiver card to update data stored in the memory in real time. Then the memory stores identity information of the replacing receiver card, so that efficient and long-term matching data exchange is implemented between the receiver card and the LED display module, thereby improving working stability and data transmission efficiency in the LED display screen. Therefore, in this embodiment, after the receiver card is replaced, adaptive parameter configuration can be performed for the replacing receiver card to complete compatible communication between the receiver card and the LED display module, and real-time identity information of the receiver card can also be stored in the memory to ensure continuity of data matching transmission between the receiver card and the LED display module. During next data transmission, matching data transmission can still be implemented between the receiver card and the LED display module.

Figure 5:
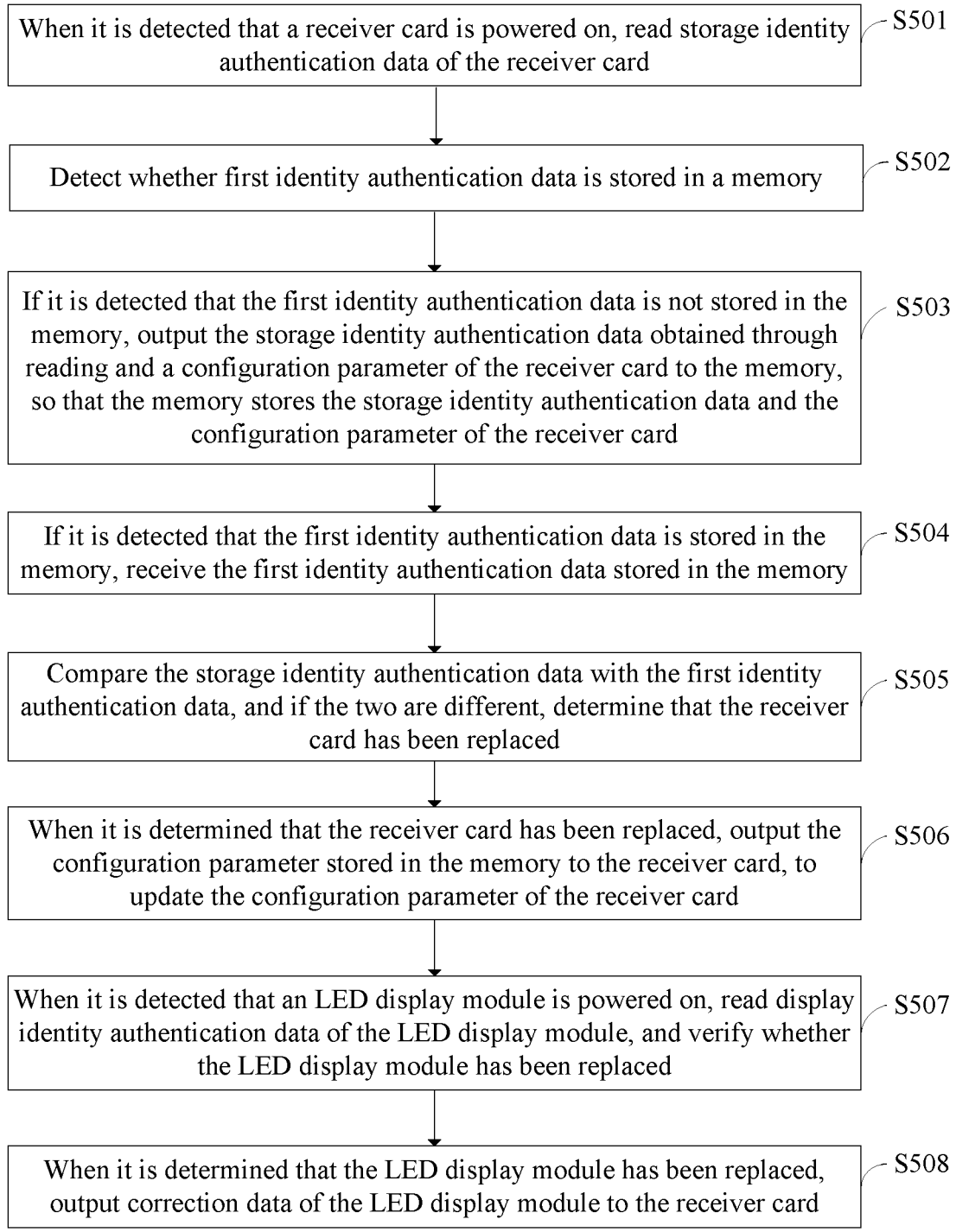
FIG. 5 is another specific flowchart of a configuration update method applied to a display screen according to an embodiment of this application.

In an optional implementation, FIG. 5 shows another implementation process of the configuration update method provided in this embodiment. Compared with the implementation processes of the configuration update in FIG. 2 and FIG. 3, in FIG. 5, before the receiving the first identity authentication data stored in the memory, the configuration update method further includes the following steps.

S502: Detect whether the first identity authentication data is stored in the memory.

Before parameter reconfiguration is performed for the updated receiver card, whether the LED display screen is used for the first time is identified first. A real-time working status of the LED display screen can be accurately determined by using the first identity authentication data stored in the memory, to implement adaptive adjustment on parameters of the replacing receiver card during configuration.

S503: If it is detected that the first identity authentication data is not stored in the memory, output the storage identity authentication data obtained through reading and the configuration parameter of the receiver card to the memory, so that the memory stores the storage identity authentication data and the configuration parameter of the receiver card.

When the first identity authentication data is not stored in the memory, it indicates that no identity information of a previous receiver card is stored in the memory, and it indicates that the LED display screen is used for the first time. In this case, no parameter reconfiguration process needs to be performed for the receiver card, and only the storage identity authentication data and the configuration parameter of the receiver card need to be output to the memory, so that the memory stores identity information of the receiver card. In addition, in this case, both the receiver card and the LED display module are in an initial state. Then matching communication is directly performed between the receiver card and the LED display module, and the LED display screen starts to enter a normal working status.

S504. If it is detected that the first identity authentication data is stored in the memory, receive the first identity authentication data stored in the memory.

When identity information of a previous receiver card is stored in the memory, it indicates that the LED display screen is not used for the first time. In this case, whether a current receiver card has been replaced is determined based on a result of comparison between the identity information of the receiver card that is previously stored in the memory and identity information of the current receiver card.

Therefore, a replacement status of the current receiver card can be recognized and determined only when the identity information of the previous receiver card is pre-stored in the memory, to ensure accuracy and efficiency of determining the replacement status of the receiver card in this embodiment. In addition, efficient parameter resetting is performed for a replacing receiver card, so that the LED display screen has higher data exchange security and stability. On the contrary, if the LED display screen is used for the first time, the receiver card can directly perform matching communication with the LED display module after power-on, and the storage identity authentication data of the receiver card and the configuration parameter of the receiver card are initialized to the memory, to provide a reference criterion for determining whether the receiver card is replaced next time, and improve efficiency of parameter matching configuration between the receiver card and the LED display module.

Figure 6:
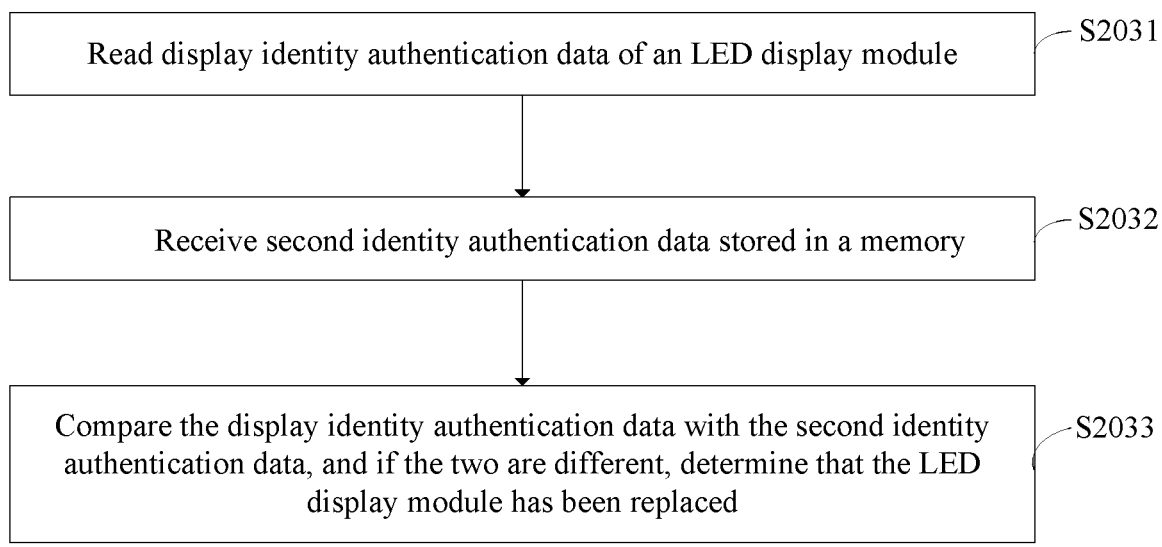
FIG. 6 is a specific flowchart of S203 of the configuration update method applied to a display screen in FIG. 2.

In an optional implementation, FIG. 6 shows a specific implementation of S203 of the configuration update method in FIG. 2 provided in this embodiment. Referring to FIG. 6, the reading display identity authentication data of the LED display module, and verifying whether the LED display module has been replaced in S203 specifically includes the following steps.

S2031: Read the display identity authentication data of the LED display module.

After the LED display module is successfully powered on, identity information of the current LED display module is collected in real time to determine whether the current LED display module has been replaced, thereby increasing a rate for determining whether the current LED display module has been replaced.

S2032: Receive the second identity authentication data stored in the memory.

Specifically, the second identity authentication data pre-stored in the memory indicates identity information of a previous LED display module, and the identity information of the previous LED display module is used as a reference value for determining a replacement status of the current LED display module. Therefore, whether the current LED display module has been replaced can be accurately determined by using an information storage function of the memory on the signal adapter, thereby simplifying detection steps for the replacement status of the current LED display module.

S2033: Compare the display identity authentication data with the second identity authentication data, and if the two are different, determine that the LED display module has been replaced.

Specifically, if display identity authentication data of the current LED display module that is obtained through real-time collection is the same as the second identity authentication data pre-stored in the memory, it indicates that identity information of the current LED display module is the same as that of the previous LED display module. In this case, it is determined that the LED display module in the LED display screen has not been replaced, parameter reconfiguration does not need to be performed for the current LED display module, and the current LED display module exchanges data with the receiver card based on a previous communication matching mode. The current LED display module can receive a video control signal and perform normal video display. If display identity authentication data of the current LED display module that is obtained through real-time collection is different from the second identity authentication data pre-stored in the memory, it indicates that identity information of the current LED display module is different from that of the previous LED display module, and the LED display module in the LED display screen has been replaced. In this case, parameter matching needs to be performed between a replacing LED display module and the receiver card, so that the receiver card can re-send a video control signal to the replacing LED display module, the replacing LED display module can quickly resume a normal working status, and the LED display screen has higher working stability and reliability.

This embodiment is based on identity information of an LED display module in two different time periods. The identity information in the two different time periods includes identity information of a current LED display module and identity information of a previous LED display module, thereby implementing efficient and fast detection on a replacement status of each LED display module in the LED display screen, without additional manual detection. In this embodiment, whether an LED display module has been replaced can be determined more easily, and a determining result is more accurate, thereby reducing matching configuration costs and configuration steps for an updated LED display module.

Figure 7:
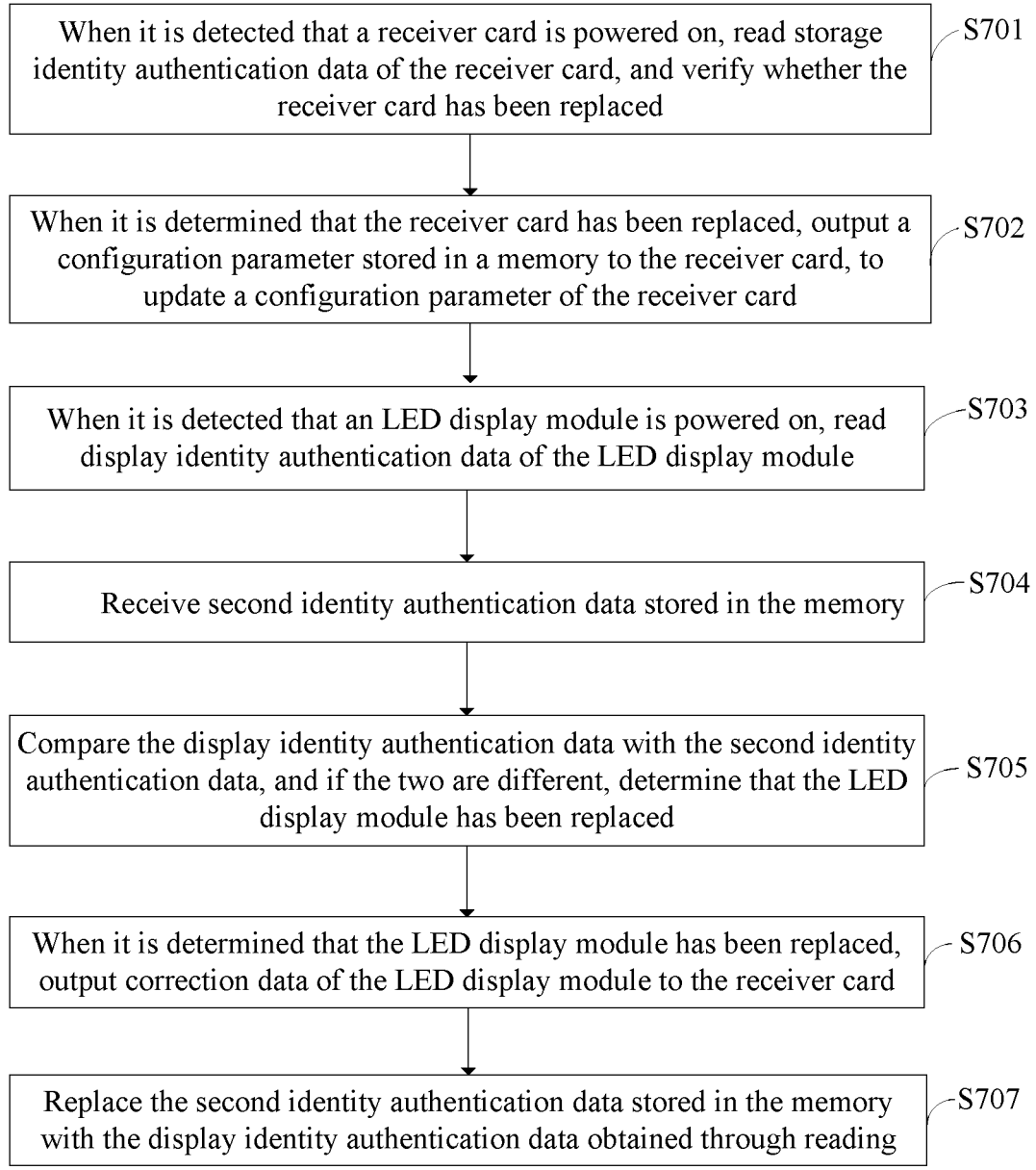
FIG. 7 is another specific flowchart of a configuration update method applied to a display screen according to an embodiment of this application.

In an optional implementation, FIG. 7 shows another implementation process of the configuration update method provided in this embodiment. Compared with the implementation processes of the configuration update method in FIG. 2 and FIG. 6, in FIG. 7, after outputting correction data of the LED display module to the receiver card, the configuration update method further includes the following step.

S707: Replace the second identity authentication data stored in the memory with the display identity authentication data obtained through reading.

When it is determined that the LED display module has been replaced, the receiver card is notified by the correction data of the LED display module, so that the receiver card can learn that the current LED display module has been replaced. In addition, the second identity authentication data of the current LED display module is sent to the memory, and then the memory can store identity information of the current LED display module to complete an update operation for data stored in the memory. Therefore, after matching communication setting is performed for a replacing LED display module, adaptive configuration is performed for the second identity authentication data stored in the memory, to provide a reference for a next identity information authentication process for the LED display module, and ensure working stability and continuous and secure video display of the LED display module in the LED display screen, so that a working status of the LED display screen is more stable.

Figure 8:
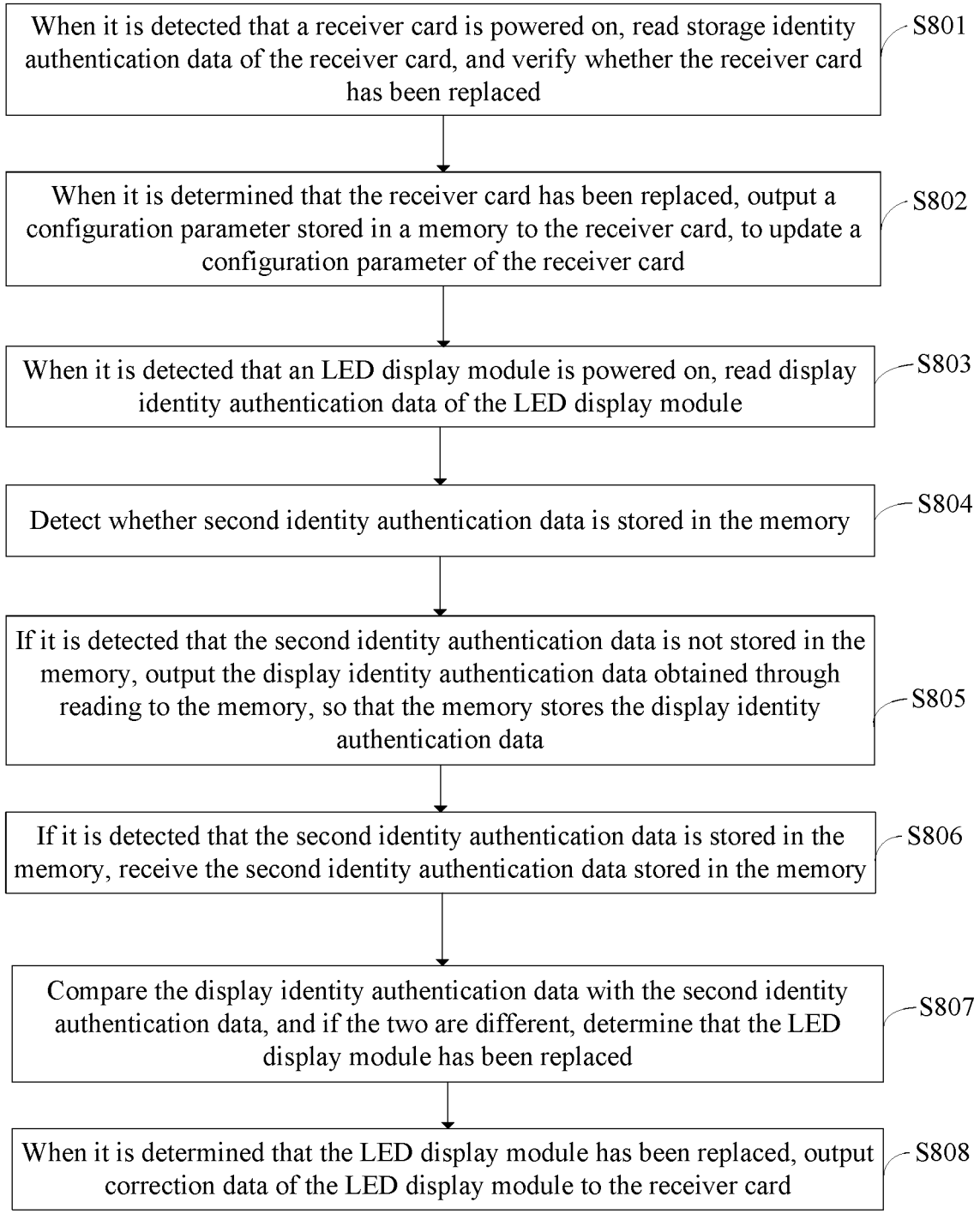
FIG. 8 is another specific flowchart of a configuration update method applied to a display screen according to an embodiment of this application.

In an optional implementation, FIG. 8 shows another implementation process of the configuration update method shown in this embodiment. Compared with FIG. 2 and FIG. 6, in FIG. 8, before the receiving the second identity authentication data stored in the memory, the configuration update method further includes the following steps.

S804: Detect whether the second identity authentication data is stored in the memory.

The memory on the signal adapter has a data storage function. Whether the second identity authentication data is stored in the memory is detected in real time, to determine whether the LED display screen is used for the first time. Then a replacement status of the LED display module is detected more accurately in real time, thereby improving adaptive recognition accuracy of identity information of the LED display module in the LED display screen, so that the replacement status of the LED display module can be monitored more efficiently.

S805: If it is detected that the second identity authentication data is not stored in the memory, output the display identity authentication data obtained through reading to the memory, so that the memory stores the display identity authentication data.

When no identity information of an LED display module is stored in the memory, it indicates that no identity information of a previous LED display module is recorded in the memory, and the LED display screen is used for the first time. In this case, no adaptive matching communication setting needs to be performed for the LED display module, and compatible communication can be directly performed between the current LED display module and the receiver card. The current LED display module receives and recognizes a video control signal to achieve a clear video display effect. In addition, because no data is stored in the memory on the signal adapter, the display identity authentication data of the current LED display module is initialized to the memory, and then the memory stores the display identity authentication data of the current LED display module. In this case, the second identity authentication data stored in the memory can be used as a reference for a next replacement status determining process for the LED display module, to ensure video display stability and efficiency of the LED display module in the LED display screen. In this embodiment, efficiency of communication matching between the LED display module and the receiver card can be ensured during first use of the LED display screen.

S806: If it is detected that the second identity authentication data is stored in the memory, receive the second identity authentication data stored in the memory.

If identity information of a previous LED display module is pre-stored in the memory, it indicates that the LED display screen is not used for the first time, and identity information of a current LED display module needs to be recognized to determine whether the current LED display module in the LED display screen has been replaced. When the second identity authentication data is pre-stored in the memory, comparison and recognition are performed based on the previously stored second identity authentication data and display identity authentication data of the current LED display module to complete communication matching setting for a replacing LED display module.

Therefore, in this embodiment, before a replacement status of the current LED display module is recognized, a data storage status of the memory is detected to determine whether the LED display screen is used for the first time, so as to adaptively recognize and control the replacement status of the current LED display module in different use environments, thereby greatly improving efficiency of matching communication between the current LED display module and the receiver card, so that the LED display screen can always be in a normal working status.

Figure 9:
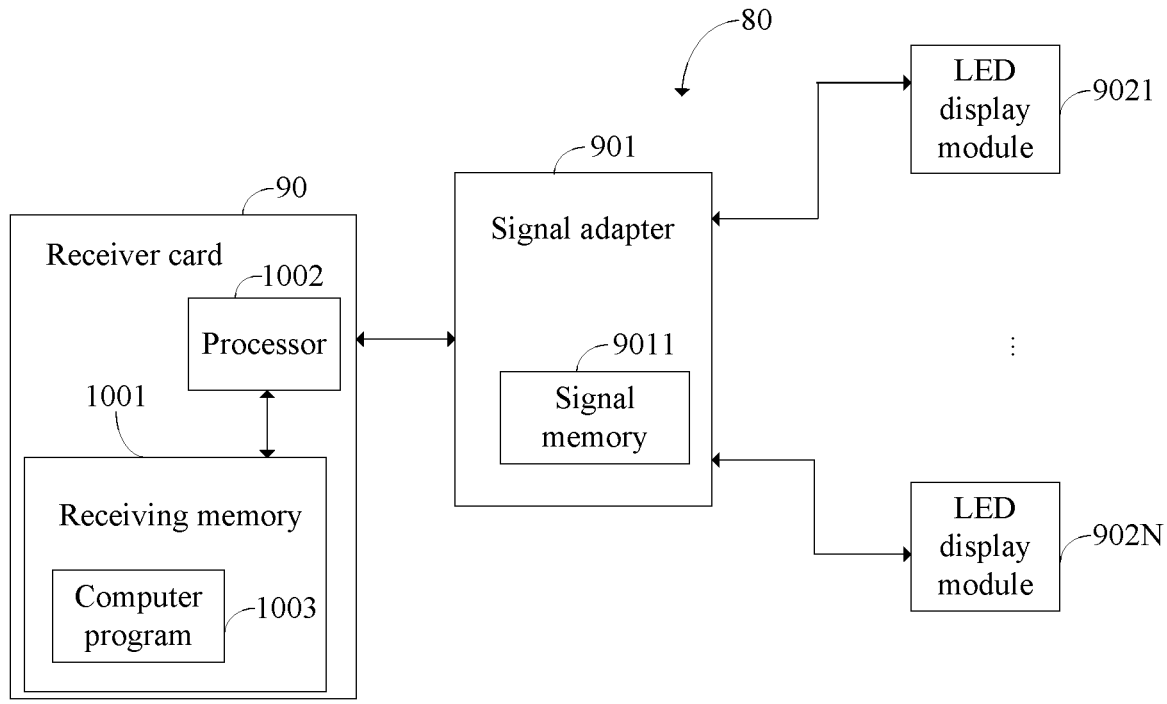
FIG. 9 is a schematic structural diagram of a receiver card according to an embodiment of this application.

FIG. 9 is a schematic structural diagram of a receiver card 90 according to an embodiment. Referring to FIG. 9, the receiver card 90 is applied to an LED display screen 80. The LED display screen 80 includes a signal adapter 901 and a plurality of LED display modules (9021, . . . , and 902N are used in FIG. 9). The receiver card 90 is connected to the signal adapter 901. The signal adapter 901 is connected to the plurality of LED display modules. The receiver card 90 is configured to output a video control signal. The signal adapter 901 is configured to transmit the video control signal to the LED display modules. The signal adapter 901 includes a signal memory 9011. The signal memory 9011 is configured to pre-store first identity authentication data of the receiver card 90 and a configuration parameter of the receiver card 90.

The receiver card 90 includes a receiving memory 1001, a processor 1002, and a computer program 1003 stored in the receiving memory 1001 and capable of running on the processor 1002.

The processor 1002 calls the computer program 1003 to perform the following steps:

when power-on is detected, reading storage identity authentication data of the receiver card 90, and verifying whether the receiver card 90 has been replaced; and when it is determined that the receiver card 90 has been replaced, outputting a configuration parameter stored in the signal memory 9011 to the receiver card 90, to update a configuration parameter of the receiver card 90.

In this embodiment, the program is executed by the receiver card 90. The receiver card 90 communicates with the signal adapter 901. Based on the identity information of the receiver card that is previously stored in the signal memory 9011 on the signal adapter 901, the receiver card 90 can determine in real time whether the receiver card 90 has been replaced. When it is determined that the receiver card 90 has been replaced, the configuration parameter pre-stored in the signal memory 9011 is used to perform parameter resetting for the receiver card 90, so that the receiver card 90 and the LED display module can quickly resume a matching communication status, and the LED display module can display clearer and more complete image information.

A configuration update process of the receiver card 90 in FIG. 9 corresponds to the embodiments of FIG. 1 and FIG. 2. Therefore, for a specific implementation of FIG. 9, refer to the embodiments of FIG. 1 to FIG. 8. Details are not described herein again.

In an optional implementation, referring to FIG. 9, the receiving memory 1001 on the receiver card 90 is further configured to store storage identity authentication data and a configuration parameter of the receiver card 90 in real time. Then whether there is a difference between identity information of the current receiver card 90 and identity information of a previous receiver card may be determined based on a difference between the storage identity authentication data stored in the receiving memory 1001 in real time and the first identity authentication data previously stored in the signal memory 9011, to complete a process of determining the identity information of the receiver card 90. If it is determined that the current receiver card 90 has been replaced, the configuration parameter previously stored in the signal memory 9011 is replaced with the configuration parameter stored in the receiving memory 1001 to update the configuration parameter of the current receiver card 90. Then adaptive parameter matching is implemented between the current receiver card 90 and the LED display module, and a video control signal is output to the LED display module through the signal adapter 901, so that the LED display screen can work normally. Therefore, in this embodiment, although the receiver card 90 may be replaced at any time, and identity information and a configuration parameter stored in the receiving memory 1001 in real time also change in real time, because identity information of a previous receiver card is pre-stored in the signal memory 9011, whether the receiver card 90 has been replaced is determined efficiently, and parameter reconfiguration can be performed for a replacing receiver card 90, thereby simplifying parameter configuration update steps for the receiver card 90, and saving time in joint commissioning and joint testing for the receiver card 90.

Figure 10:
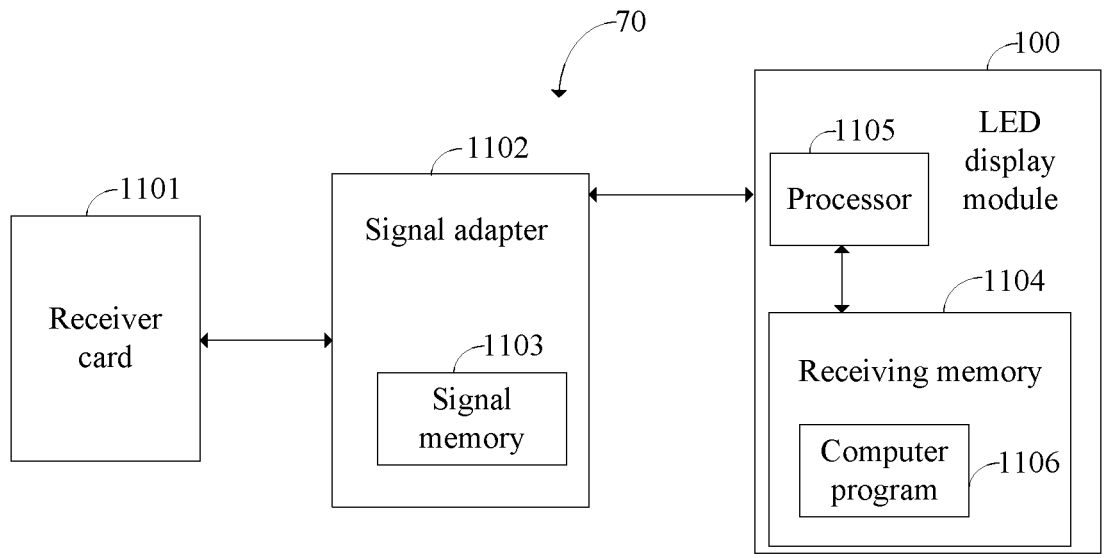
FIG. 10 is a schematic structural diagram of an LED display module according to an embodiment of this application.

FIG. 10 is a schematic structural diagram of an LED display module 100 according to an embodiment. Referring to FIG. 10, the LED display module 100 is applied to an LED display screen 70. The LED display screen 70 includes a receiver card 1101 and a signal adapter 1102. The signal adapter 1102 is connected to the receiver card 1101. The signal adapter 1102 is connected to the LED display module 100. The receiver card 1101 is configured to output a video control signal. The signal adapter 1102 is configured to transmit the video control signal to the LED display module 100. A signal memory 1103 is disposed on the signal adapter 1102. The signal memory 1103 is configured to pre-store second identity authentication data of the LED display module 100. The LED display module 100 includes a receiving memory 1104, a processor 1105, and a computer program 1106 stored in the receiving memory 1104 and capable of running on the processor 1105.

The processor 1105 calls the computer program 1106 to perform the following steps:

when power-on is detected, reading display identity authentication data of the LED display module 100, and verifying whether the LED display module 100 has been replaced; and when it is determined that the LED display module 100 has been replaced, outputting correction data of the LED display module 100 to the receiver card 1101.

In this embodiment, the computer program is executed by the LED display module 100. The LED display module 100 can determine, based on identity information previously stored in the signal memory 1103, whether the LED display module 100 has been replaced. A determining process is simple and does not require external manual operations. In addition, when it is determined that the LED display module has been replaced, the receiver card 1101 is notified by correction data of the LED display module, so that the receiver card 1101 can obtain real-time replacement information of the LED display module 100 in real time, and a replacing LED display module 100 and the receiver card 1101 quickly resume a matching communication status in a short time range, thereby completing an adaptive configuration update of the LED display module 100, and simplifying identity information recognition and matching communication configuration steps for the LED display module 100, so that the LED display module 100 has higher video display efficiency.

It should be noted that configuration update steps of the LED display module 100 in FIG. 10 correspond to the embodiments of FIG. 1 and FIG. 2. Therefore, for a specific implementation of FIG. 10, refer to the embodiments of FIG. 1 to FIG. 8. Details are not described herein again.

Figure 11:
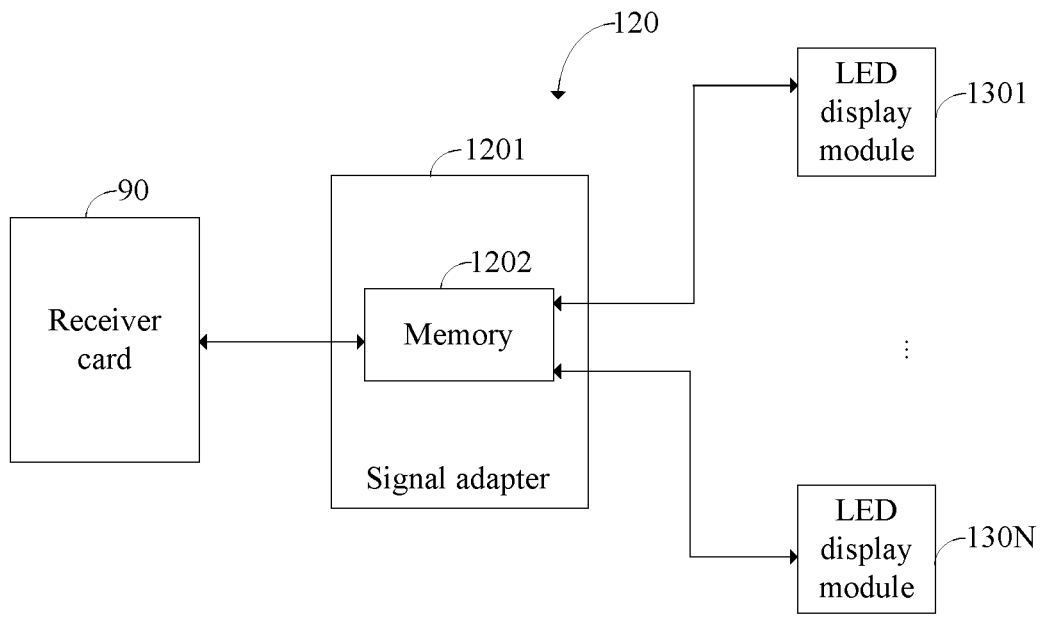
FIG. 11 is another schematic structural diagram of a display screen according to an embodiment of this application.

FIG. 11 is a schematic structural diagram of an LED display screen 120 according to an embodiment. Referring to FIG. 11, the LED display screen 120 includes the foregoing receiver card 90, a signal adapter 1201 and the foregoing plurality of LED display modules (denoted as 1301, ..., and 130N in FIG. 12). The receiver card 90 is connected to the signal adapter 1201. The signal adapter 1201 is connected to the plurality of LED display modules. The receiver card 90 is configured to output a video control signal. The signal adapter 1201 is configured to transmit the video control signal to each LED display module. A memory 1202 is disposed on the signal adapter 1201. The memory 1202 is configured to pre-store first identity authentication data of the receiver card 90, a configuration parameter of the receiver card 90, and second identity authentication data of each LED display module.

With reference to the embodiments of FIG. 9 and FIG. 10, in the LED display screen 120 shown in FIG. 11, on the one hand, when it is detected that the receiver card 90 is powered on, storage identity authentication data of the receiver card 90 is read in real time, and it is verified whether the receiver card 90 has been replaced. If it is determined that the receiver card 90 has been replaced, the configuration parameter previously stored in the memory 1202 is output to the receiver card 90 to update a configuration parameter of the receiver card 90, so as to automatically determine whether the receiver card 90 has been replaced. In addition, parameter correction configuration is performed for a replacing receiver card 90, so that after the receiver card 90 in the LED display screen 120 is replaced, a normal working status can be quickly resumed without professional technicians, saving time and efforts.

On the other hand, when it is detected that any LED display module is powered on, whether the current LED display module has been replaced is immediately determined in real time. Specifically, display identity authentication data of the LED display module is read in real time, and it is verified whether the LED display module has been replaced. If it is determined that the LED display module has been replaced, correction data of the LED display module is output to the receiver card 90, to notify the receiver card 90 by using the correction data. Then a matching communication mode is re-established between a replacing LED display module and the receiver card 90, and the replacing LED display module quickly resumes a normal video display status, thereby improving working efficiency and working security of the LED display module. Communication status matching setting steps of the replacing LED display module are comparatively simple, and the LED display screen 120 has higher practical value.

Therefore, in the LED display screen 120 in this embodiment, adaptive matching configuration can be performed for the replacing receiver card 90/LED display module. For example, after a maintenance person replaces the receiver card 90, the receiver card 90 automatically adapts to the screen, and the receiver card 90 resumes a normal communication status by using the configuration parameter previously stored in the memory 1202, so that the screen resumes a working status or resumes a working status in a short time. Application is simple, without additional professional operations, thereby saving a lot of time in joint commissioning and joint testing for a project. This resolves a problem in a conventional technology that, parameter configuration is manually performed for each display component, and configuration progress is slow due to software and program package version issues; as a result, a configuration update of an LED display module is time-consuming and labor-intensive, causing great inconvenience to use by a user.

In an optional implementation, referring to FIG. 11, the receiver card 90 is directly connected to the memory 1202 through an SPI (Serial Peripheral Interface, serial peripheral interface) bus, and then the receiver card 90 can directly access the memory 1202 to implement two-way data transmission and complete a configuration update for the receiver card 90, thereby improving efficiency of internal signal communication of the LED display screen 120. Therefore, in this embodiment, the receiver card 90 obtains more complete identity data, thereby further simplifying steps of determining a replacement status of the receiver card 90.

Figure 12:
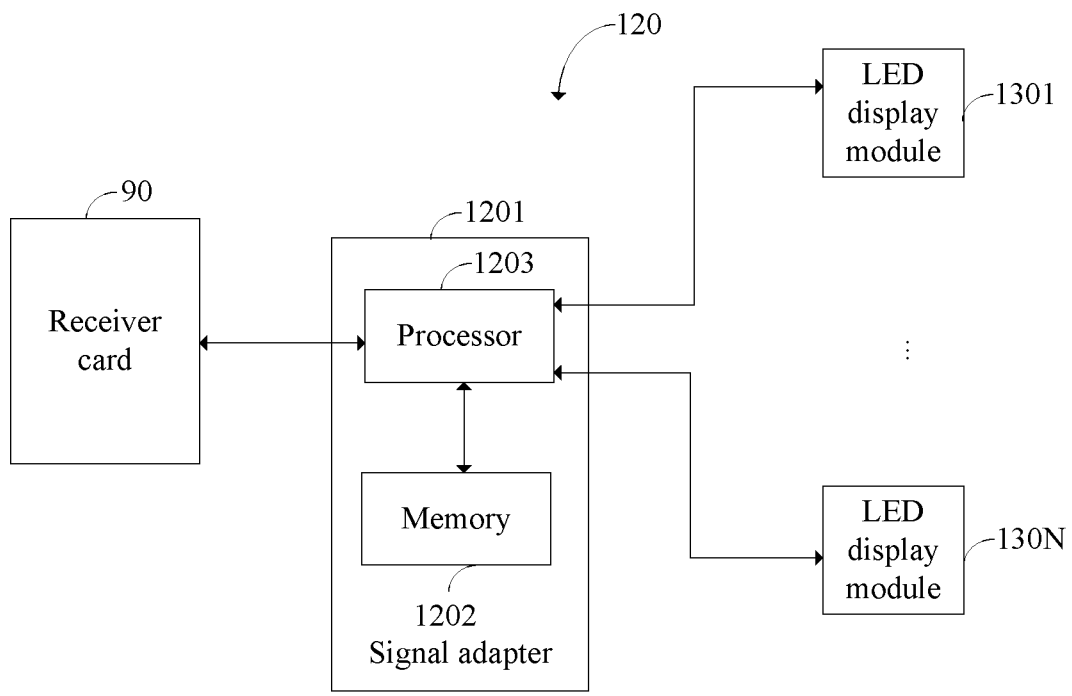
FIG. 12 is another schematic structural diagram of a display screen according to an embodiment of this application.

In an optional implementation, FIG. 12 is another schematic structural diagram of the LED display screen 120. Compared with FIG. 11, a processor 1203 is further disposed on the signal adapter 1201 in FIG. 12. The receiver card 90 is connected to the processor 1203 through a UART (Universal Asynchronous Receiver/Transmitter, universal asynchronous receiver/transmitter) bus, and each LED display module is connected to the processor 1203 through the UART bus. The UART bus can implement asynchronous data transmission of data, so that large-capacity data transmission can be performed between the signal adapter 1201 and the receiver card 90, thereby guaranteeing an anti-interference capability of data transmission, and improving configuration update efficiency for the receiver card 90 and/or the LED display module. Therefore, the receiver card 90 and/or the LED display module can be accurately identified based on identity information previously stored in the memory 1202, and the LED display screen 120 has higher data matching communication efficiency.

Therefore, in the schematic structural diagram of the LED display screen 120 shown in FIG. 12, the receiver card 90 and the LED display module indirectly access the memory 1202 through the processor 1203 to obtain previously stored identity authentication data, version information, screen configuration file information, screen connection file information, and the like. Then data stored in the memory 1202 is accessed through the processor 1203. Internal data storage security of the memory 1202 is higher, and accuracy and efficiency of adaptive configuration updates of the receiver card 90 and/or the LED display module are guaranteed. In this embodiment, the LED display screen 120 can be applied to various communication environments. The data stored in the memory 1202 is used to perform an adaptive parameter configuration process for the receiver card 90 and/or the LED display module. An internal matching communication commissioning process of the LED display screen 120 is further simplified.

In this specification, various embodiments are described for devices, circuits, apparatuses, systems, and/or methods. Many specific details are illustrated to provide a thorough understanding of an overall structure, functions, manufacturing, and use of the embodiments described in this specification and shown in the accompanying drawings. However, a person skilled in the art should understand that the embodiments may be implemented without such specific details. In other examples, well-known operations, components, and elements are described in detail to make the embodiments in this specification understandable. A person skilled in the art should understand that the embodiments described in this specification are non-limitative examples, and therefore can figure out that the specific structural and functional details disclosed in this specification may be representative and do not necessarily limit the scope of the embodiments.

Throughout the specification, a reference to "various embodiments", "in an embodiment", "an embodiment", "embodiment", or the like means that a specific feature, structure, or characteristic described with respect to an embodiment is included in at least one embodiment. Therefore, appearance of the phrase "in various embodiments", "in some embodiments", "in one embodiment", "in an embodiment", or the like at an appropriate place throughout the specification does not necessarily mean a same embodiment. In addition, specific features, structures, or characteristics may be combined in any suitable manner in one or more embodiments. Therefore, a specific feature, structure, or characteristic shown or described with respect to an embodiment may be entirely or partially combined with a feature, a structure, or a characteristic of one or more other embodiments, without assuming that such a combination is illogical or non-functional. Any direction reference (for example, plus, minus, up, down, upward, downward, left, right, leftward, rightward, top, bottom, above, below, vertical, horizontal, clockwise, and counterclockwise) is used for identification purposes to help readers understand the content of this disclosure, and does not constitute a limitation, especially regarding a location, an orientation, or use of an embodiment.

Although some embodiments are described above in detail to some extent, a person skilled in the art can make many changes to the disclosed embodiments without departing from the scope of this disclosure. A connection reference (for example, attaching, coupling, or connecting) should be interpreted broadly, and may include intermediate components in connections between elements and relative movements between elements. Therefore, the connection reference does not necessarily imply that two elements are directly connected/coupled and in a fixed relationship. The use of "for example" throughout the specification should be interpreted broadly and used to provide non-limitative examples of the embodiments of this disclosure, and this disclosure is not limited to such examples. An intention is to indicate that all matters included in the foregoing descriptions or shown in the accompanying drawings should be construed as merely illustrative but not limitative. Changes in details or structures can be made without departing from this disclosure.

The foregoing descriptions are merely optional embodiments of this application, but are not intended to limit this application. For a person skilled in the art, this application may have various changes and variations. Any modification, equivalent replacement, or improvement made within the spirit and principle of this application shall fall within the protection scope of the claims of this application.

What is claimed is:

1. A configuration update method for an LED display screen, wherein the LED display screen comprises a receiver card, a signal adapter, and a plurality of LED display modules, the receiver card is connected to the signal adapter, the signal adapter is connected to the plurality of LED display modules, the receiver card is configured to output a video control signal to be transmitted to each LED display module through the signal adapter, a memory is disposed on the signal adapter, and the method comprises:
   when it is detected that the receiver card is powered on, reading storage identity authentication data of the receiver card, and verifying whether the receiver card has been replaced;
   when it is determined that the receiver card has been replaced, outputting a configuration parameter stored in the memory to the receiver card, to update a configuration parameter of the receiver card;
   when it is detected that the LED display module is powered on, reading display identity authentication data of the LED display module, and verifying whether the LED display module has been replaced; and
   when it is determined that the LED display module has been replaced, outputting correction data of the LED display module to the receiver card.

2. The method according to claim 1, wherein the receiver card is further used for video signal transmission, video signal processing, screen loading configuration, correction data storage, and working status indication, and the video control signal comprises video data and video driver data.

3. The method according to claim 1, wherein the memory is configured to store first identity authentication data of the receiver card, the configuration parameter of the receiver card, and second identity authentication data of each LED display module.

4. The method according to claim 3, wherein the first identity authentication data comprises identity information of the receiver card, the second identity authentication data comprises identity information of the LED display module, and the configuration parameter comprises parameter matching information of the receiver card and the LED display module.

5. The method according to claim 1, wherein the reading storage identity authentication data of the receiver card, and verifying whether the receiver card has been replaced specifically comprises:
   reading the storage identity authentication data of the receiver card;
   receiving the first identity authentication data stored in the memory; and
   comparing the storage identity authentication data with the first identity authentication data, and if the two are different, determining that the receiver card has been replaced.

6. The method according to claim 5, wherein after the when it is determined that if the receiver card has been replaced, outputting a configuration parameter stored in the memory to the receiver card, to update a configuration parameter of the receiver card, the method further comprises:
   replacing the first identity authentication data stored in the memory with the storage identity authentication data obtained through reading.

7. The method according to claim 5, wherein before the receiving the first identity authentication data stored in the memory, the method further comprises:
   detecting whether the first identity authentication data is stored in the memory; and
   if it is detected that the first identity authentication data is not stored in the memory, outputting the storage identity authentication data obtained through reading and the configuration parameter of the receiver card to the memory, so that the memory stores the storage identity authentication data and the configuration parameter of the receiver card; or
   if it is detected that the first identity authentication data is stored in the memory, receiving the first identity authentication data stored in the memory.

8. The method according to claim 1, wherein the reading display identity authentication data of the LED display module, and verifying whether the LED display module has been replaced specifically comprises:
   reading the display identity authentication data of the LED display module;
   receiving the second identity authentication data stored in the memory; and comparing the display identity authentication data with the second identity authentication data, and if the two are different, determining that the LED display module has been replaced.

9. The method according to claim 8, wherein after the outputting correction data of the LED display module to the receiver card, the method further comprises:
replacing the second identity authentication data stored in the memory with the display identity authentication data obtained through reading.

10. The method according to claim 8, wherein before the receiving the second identity authentication data stored in the memory, the method further comprises:
detecting whether the second identity authentication data is stored in the memory; and
if it is detected that the second identity authentication data is not stored in the memory, outputting the display identity authentication data obtained through reading to the memory, so that the memory stores the display identity authentication data; or
if it is detected that the second identity authentication data is stored in the memory, receiving the second identity authentication data stored in the memory.

11. A receiver card, wherein the receiver card is applied to an LED display screen, the LED display screen comprises a signal adapter and a plurality of LED display modules, the receiver card is connected to the signal adapter, the signal adapter is connected to the plurality of LED display modules, the receiver card is configured to output a video control signal to be transmitted to the LED display module through the signal adapter, the signal adapter comprises a signal memory, and the receiver card comprises:
a receiving memory, a processor, and a computer program stored in the receiving memory and capable of running on the processor, wherein
the processor calls the computer program to perform the following steps:
when power-on is detected, reading storage identity authentication data of the receiver card, and verifying whether the receiver card has been replaced; and
when it is determined that the receiver card has been replaced, outputting a configuration parameter stored in the signal memory to the receiver card, to update a configuration parameter of the receiver card.

12. An LED display module, wherein the LED display module is applied to an LED display screen, the LED display screen comprises a receiver card and a signal adapter, the signal adapter is connected to the receiver card, the signal adapter is connected to the LED display module, the receiver card is configured to output a video control signal to be transmitted to the LED display module through the signal adapter, a signal memory is disposed on the signal adapter, and the LED display module comprises:
a receiving memory, a processor, and a computer program stored in the receiving memory and capable of running on the processor, wherein
the processor calls the computer program to perform the following steps:
when power-on is detected, reading display identity authentication data of the LED display module, and verifying whether the LED display module has been replaced; and
when it is determined that the LED display module has been replaced, outputting correction data of the LED display module to the receiver card.

13. An LED display screen, comprising a signal adapter, the receiver card according to claim 11, and a plurality of LED display modules according to claim 12, wherein the receiver card is connected to the signal adapter, the signal adapter is connected to the plurality of LED display modules, the receiver card is configured to output a video control signal to be transmitted to each LED display module through the signal adapter, and a memory is disposed on the signal adapter.

14. The LED display screen according to claim 13, wherein the receiver card is connected to the memory to directly access the memory.

15. The LED display screen according to claim 13, wherein the signal adapter further comprises a processor, the processor is connected to the receiver card, each LED display module, and the memory, and the processor is used for the receiver card and each LED display module to access data in the memory.

* * * * *